United States Patent
Cobb et al.

(10) Patent No.: US 7,296,378 B1
(45) Date of Patent: Nov. 20, 2007

(54) SYSTEM FOR ATTRACTING FISH

(75) Inventors: Stephen Russell Cobb, Greesboro, NC (US); Michael D. Jacobson, Greensboro, NC (US); Joseph A. Lupia, Colfax, NC (US)

(73) Assignee: Carolina Lunker Sauce, L.L.C., Raleigh, NC (US)

( * ) Notice: Subject to any disclaimer, the term of this patent is extended or adjusted under 35 U.S.C. 154(b) by 0 days.

(21) Appl. No.: 10/979,539

(22) Filed: Nov. 2, 2004

Related U.S. Application Data

(62) Division of application No. 10/236,733, filed on Sep. 6, 2002, now Pat. No. 6,827,930.

(51) Int. Cl.
*A01K 85/00* (2006.01)
(52) U.S. Cl. .................................. 43/42.06; 43/4
(58) Field of Classification Search .............. 43/4, 43/42.06
See application file for complete search history.

(56) References Cited

U.S. PATENT DOCUMENTS

| | | | |
|---|---|---|---|
| 4,942,043 A | 7/1990 | Sander | 426/2 |
| 5,251,395 A * | 10/1993 | Wicklund | 43/42.25 |
| 5,266,323 A * | 11/1993 | Guthrie et al. | 424/410 |
| 5,270,044 A * | 12/1993 | Fulmer et al. | 424/410 |
| 5,970,644 A | 10/1999 | Breeze | 43/4 |
| 6,335,027 B1 * | 1/2002 | Levy | 424/409 |
| 6,794,440 B2 * | 9/2004 | Chen | 524/505 |
| 2002/0188057 A1 * | 12/2002 | Chen | 524/575 |

* cited by examiner

*Primary Examiner*—Kurt Rowan
(74) *Attorney, Agent, or Firm*—MacCord Mason PLLC

(57) ABSTRACT

A sport fishing system having: a rod and reel, including fishing line; at least one fishing lure or natural bait; and a controlled released fish attractant for applying to the fishing lure or natural bait. The system may further include an applicator for applying the controlled released fish attractant to the fishing lure or natural bait. In the preferred embodiment, the controlled release fish attractant includes: an attractant and a substantially hydrophobic, film forming release agent.

25 Claims, 5 Drawing Sheets

SYSTEM FOR ATTRACTING FISH

This application is a division of utility application Ser. No. 10/236,733, filed Sep. 6, 2002 and now U.S. Pat. No. 6,827,930.

BACKGROUND OF THE INVENTION (1) Field of the Invention

The present invention relates generally to sport fishing and, more particularly, to a system for attracting fish using a controlled release fish attractant.

(2) Description of the Prior Art

The sport of fishing with artificial lures and/or natural baits for game fish, such as large mouth bass, small mouth bass, pike, walleye, and a variety of saltwater game fish has become increasingly popular in the past several years. Millions of dollars are spent on the equipment, lures, boats and other gear that facilitates sport fishing. In particular, the pursuit of the large mouth bass is the subject of a great deal of attention by the public. There are tournaments, for both professionals and amateurs, and the sport is becoming increasingly popular.

Many kinds of lures have been developed to assist the fisherman in catching freshwater fish, such as the large mouth bass. These lures take a variety of shapes, sizes and are made of a variety of materials. A great deal of time is spent in order to obtain the right lure for the right conditions. Pursuit of the saltwater game fish has become increasingly popular, as well. Tournaments for various saltwater species are held on a regular basis throughout the country. Saltwater game fishing utilizes a variety of artificial lures, as well as, live bait and cut bait.

In addition to lure development, fish attractants have been developed for application to the artificial lures. These fish attractants are designed to emit a scent and/or to have a taste that is attractive to the fish and to work in conjunction with the designed action of the lure. The purpose of the attractant is, in conjunction with the lure, to cause the fish to strike the lure so that the fisherman can catch the fish. Attractants may also be used on live bait and cut bait.

Fish attractants have taken many forms. Soft plastic baits, such as plastic worms, lizards and crayfish have been impregnated with various attractants producing a smell and/or taste which has proved to be attractive to the large mouth bass. Spray bottles containing an attractant have been used to apply a spray to hard baits, such as the crank bait or the spinner bait, and to soft baits before it is cast into the water. An attractant applied in this manner tends to dissipate in the water as the lure is being retrieved and is intended to aid in luring the fish to the lure along with the designed movement of the lure.

Many artificial lures have a great deal of flash or movement in the water, which causes commotion and causes the fish to attack the lure. The attractants are often used as a complimentary additional means to attract the fish to ensure the catch. The fish attractants are applied in different ways. The primary method for the application of a fish attractant is with a spray bottle. The spray bottle is utilized to spray the attractant on the lure before it is cast. In some cases, attractant impregnated adhesive strips are provided to affix to the lure to disperse the attractant in the water as the bait is being retrieved. Also available for use are gels and pastes impregnated with fish attractant. The use of a paste or a gel is accomplished by applying the paste or gel directly onto the lure and the attractant is released into the water as the lure is retrieved towards the fisherman. Liquid attractants are also available. The liquid is poured onto the bait to coat it before the lure is cast. Fish attractants that are most often used are various types of fish oils, salt, garlic oil and any other types of chemicals that have the tendency to attract the fish.

A major problem with the attractants utilized currently is that the attractant, whether it is a scent strip, an application from a spray bottle, a liquid application, a gel, or a paste dissipates in water either quickly or not at all. Consequently, repeated applications of the fish attractant may be necessary to ensure that the lure continues to be effective.

Thus, there remains a need for a new and improved sport fishing system which includes an effective fish attractant, which is both initially effective, while, at the same time, remains effective for an extended period of time.

SUMMARY OF THE INVENTION

The present invention is directed to a sport fishing system having: a rod and reel, including fishing line; at least one fishing lure or natural bait; and a controlled released fish attractant for applying to the fishing lure or natural bait. The system may further include an applicator for applying the controlled released fish attractant to the fishing lure or natural bait.

In the preferred embodiment, the controlled release fish attractant includes: an attractant and a substantially hydrophobic, film forming release agent. In the preferred embodiment, the attractant is water dispersible.

The attractant may be an animal by-product. The animal by-product may be an aquatic animal by-product. In the preferred embodiment, the aquatic animal by-product is selected from the group consisting of shrimp, salmon, squid, shad, sardines, anchovies, crayfish, mullet, and animal metabolites, such as pheromones.

The attractant may be a plant by-product. The plant by-product may be an aromatic plant by-product. In the preferred embodiment, the aromatic plant by-product is selected from the group consisting of anise, garlic, banana oil, and plant metabolites, such as pheromones.

The attractant may be an organic chemical. The organic chemical may be selected from the group consisting of steroids, fats, fatty acids or a nitrogen containing organic chemical. In the preferred embodiment, the nitrogen containing organic chemical is selected from the group consisting of alkaloids, amino acids, peptides, quaternary ammonium compounds, proteins and synthetic pheromones.

The attractant may further include an inorganic component, such as inorganic component is a salt. Also, the attractant may be encapsulated or complexed to further control the release time of the attractant.

In one embodiment, the substantially hydrophobic film forming releasing agent is a silicone-based polymer. Also, in the preferred embodiment, the molecular weight of the silicone-based polymer is between about 2500 and 100,000. The silicone-based polymer is an amino silicone polymer and the balance water.

In another embodiment, the substantially hydrophobic film forming releasing agent is hydrocarbon-based. Also, in the preferred embodiment, the viscosity of the hydrocarbon-based polymer is less than about 2000 cps. The hydrocarbon-based polymer is a hydrophobic fluorocarbon and the balance water.

In still another embodiment, the substantially hydrophobic film forming releasing agent is a polymer. Also, in one preferred embodiment, the polymer is an acrylic polymer and the balance water. One example is sold under the tradename Avalure AC 118 and is available from Noveon of Cleveland, Ohio. Also, in still another preferred embodiment, the polymer is a vinyl homopolymer.

The substantially hydrophobic film forming releasing agent may further include a surfactant. Also, the substantially hydrophobic film forming releasing agent may further include a thickening agent and/or further include an emulsifying agent.

In the preferred embodiment, the applicator for the controlled released fish attractant is a spray bottle, such as a hand pump applicator. However, the applicator may be an applicator kit for applying the controlled released fish attractant to the fishing lure or natural bait. In the preferred embodiment, the applicator kit may include a supply of the fish attractant and a mixing container for holding the fishing lures and/or natural baits and receiving a quantity of the fish attractant.

The fishing lure is selected from the group consisting of soft plastic baits, crank baits and spinner baits. In the preferred embodiment, the soft plastic baits are finesse baits.

Accordingly, one aspect of the present invention is to provide a sport fishing system including: a rod and reel, including fishing line; at least one fishing lure or natural bait; and a controlled released fish attractant for applying to the fishing lure or natural bait.

Another aspect of the present invention is to provide a controlled release fish attractant for use in a sport fishing system, wherein the controlled release fish attractant includes: an attractant; and a substantially hydrophobic, film forming release agent.

Still another aspect of the present invention is to provide a sport fishing system including: a rod and reel, including fishing line; at least one fishing lure or natural bait; a controlled released fish attractant for applying to the fishing lure or natural bait wherein the controlled release fish attractant includes: (i) an attractant and (ii) a substantially hydrophobic, film forming release agent; and an applicator for applying the controlled released fish attractant to the fishing lure or natural bait.

These and other aspects of the present invention will become apparent to those skilled in the art after a reading of the following description of the preferred embodiment when considered with the drawings.

DESCRIPTION OF THE PREFERRED EMBODIMENTS

Figure 1:
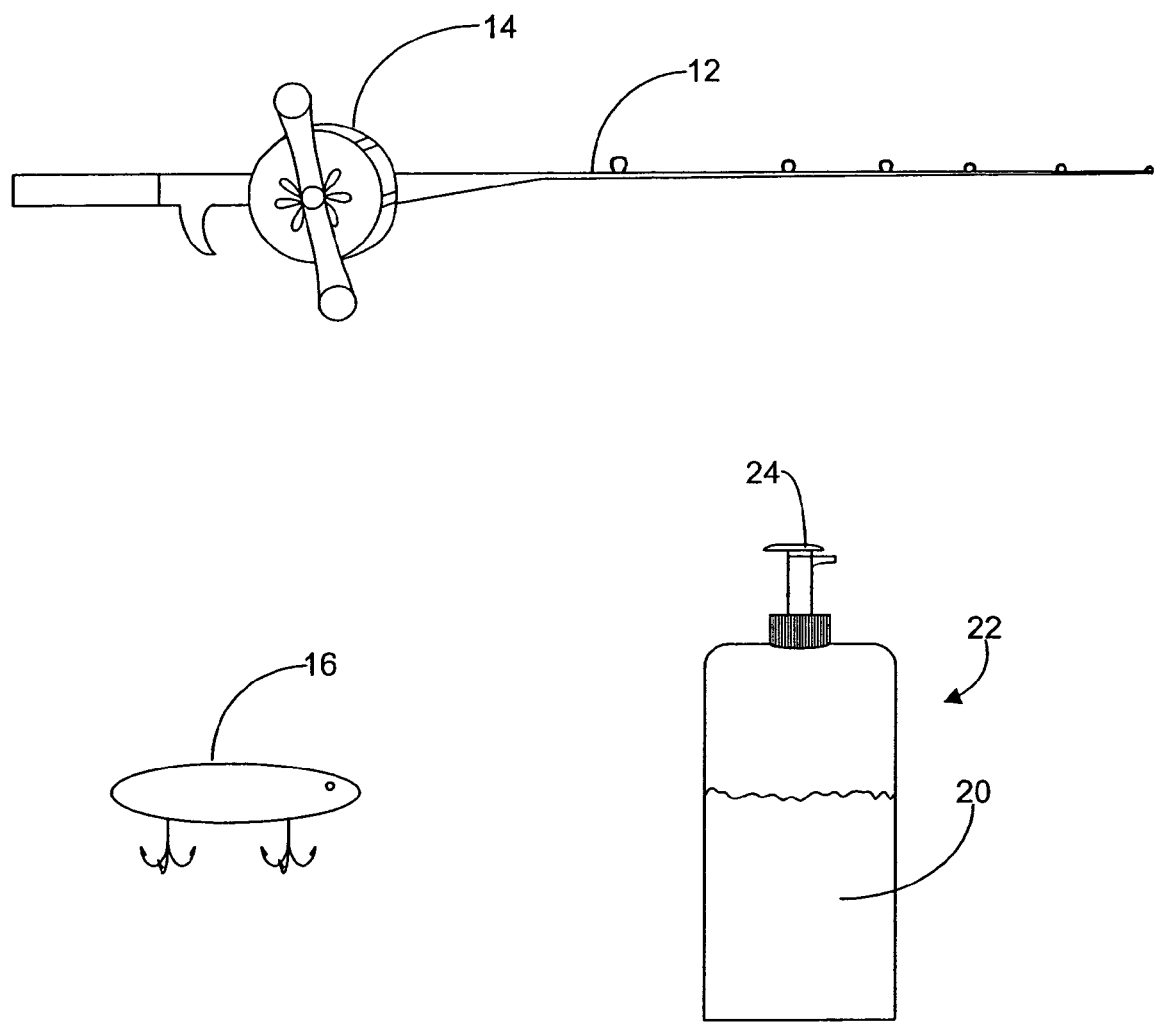
FIG. 1 is an elevation view of a sport fishing system constructed according to the present invention.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Referring now to the drawings in general and FIG. 1 in particular, it will be understood that the illustrations are for the purpose of describing a preferred embodiment of the invention and are not intended to limit the invention thereto. As best seen in FIG. 1, there is shown a sport fishing system 10 including a fishing rod 12, a fishing reel 14, lures and/or natural baits 16, and the controlled release fish attractant 20. The fishing reel 14 may be a bait casting reel, a spinning reel or a spin-casting reel. The rod 12 may be a fiberglass rod, or a graphite composite rod in either a bait-casting model or spinning model. The rod 12 and reel 14 also includes fishing line 18.

Figure 2:
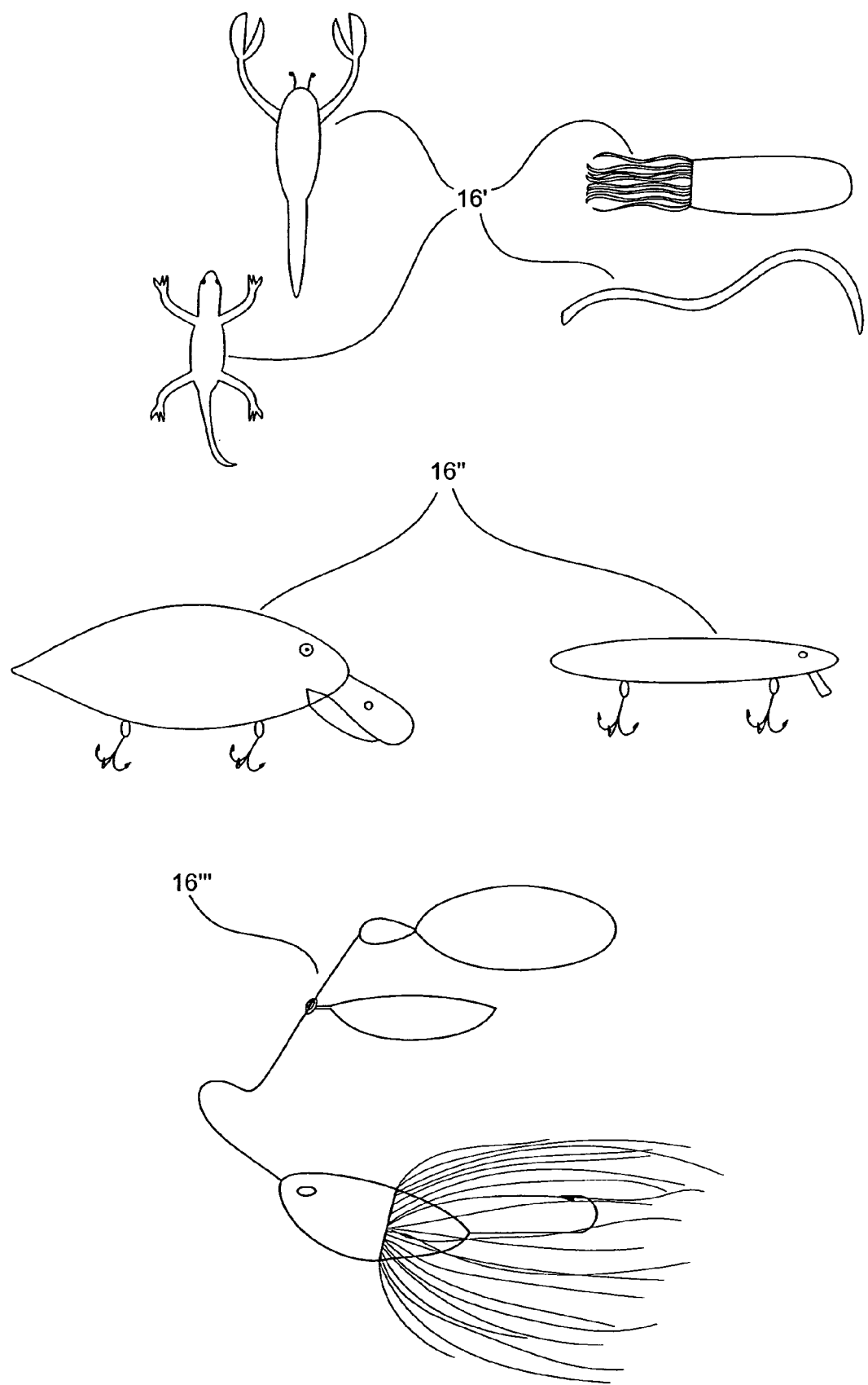
FIG. 2 is an elevation view of types of artificial lures and/or natural baits that may be utilized by the sport fishing system of the present invention.

Referring now to FIG. 2, the fishing lure 16 may be of the soft plastic type 16', it may also be a hard body crank bait 16", or it may be a spinner bait 16'''. The soft plastic baits 16' come in a variety of shapes and sizes and may replicate worms, crayfish, lizards or tube baits. The crank baits 16" also come in a variety of shapes and sizes, are deep diving crank baits, shallow running crank baits, or top water crank baits. It can be long and slender or short and fat, and in a wide variety of colors and shapes with different functions depending on the design. Finally, the spinner bait 16''' preferably is constructed of wire, has blades made of bright and reflective material, has a hard body with a skirt which also contains the hook. The spinner bait 16''' comes in a variety of sizes, shapes and colors with single or multiple blades to produce the flash.

Figure 3A:
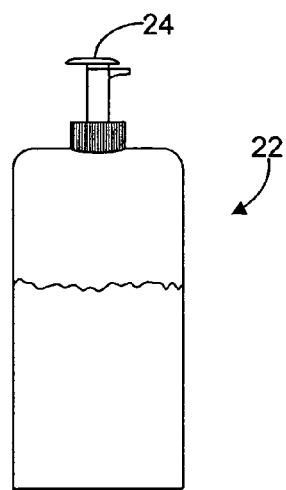
FIG. 3a is an elevation view of a fish attractant applicator constructed according to the present invention.
Figure 3B:
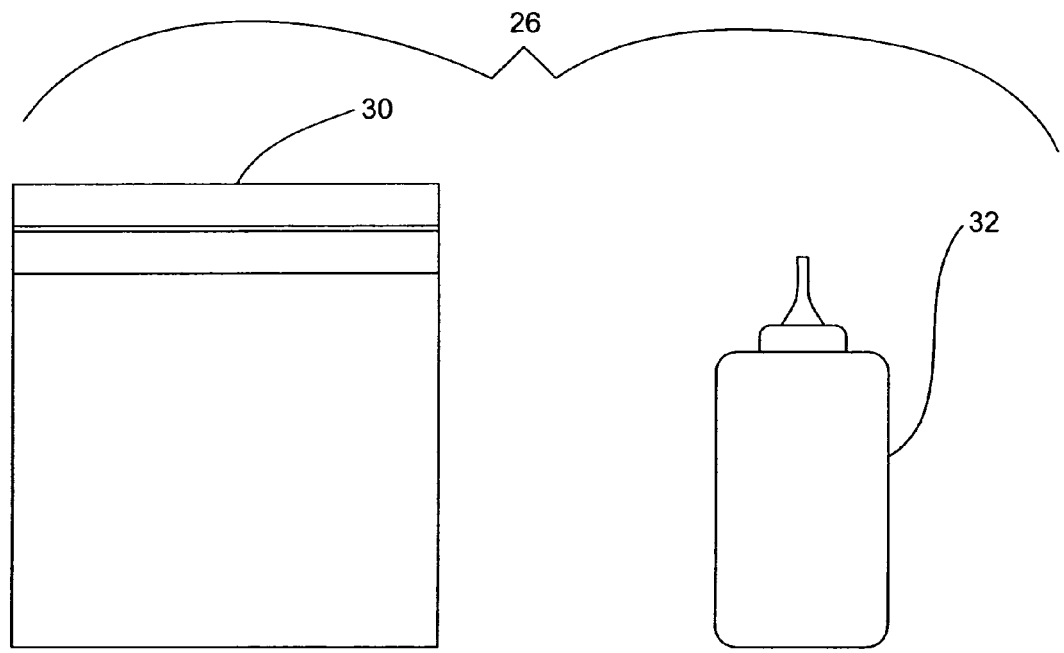
FIG. 3b is an elevation view of a fishing attractant application kit constructed according to the present invention.

Referring to FIGS. 3a and 3b, two types of fish attractant applicators 22 are shown. Specifically in FIG. 3a, a spray-type hand pump 24 is shown. This hand pump 24 would contain the fish attractant 20 and would be sprayed on the lures and/or natural baits 16 selected before the lures and/or natural baits 16 are cast into the water and then returned.

FIG. 3b illustrates an applicator kit 26. In the preferred embodiment, the applicator kit 26 is composed of a mixing "baggie" 30, and a container to hold a supply of the fish attractant 20. This applicator kit 26 would generally be used for the lures and/or natural baits 16. The lures and/or natural baits would be placed inside the baggie 30 and some of the fish attractant 20 from the applicator container 32 would be put into the baggie 30 with the soft plastic lures and/or natural baits 16. The baggie 30 would be sealed and shaken, thereby, coating all of the plastic lures and/or natural baits 16 with the fish attractant 20.

In the preferred embodiment, the controlled release fish attractant includes: an attractant and a substantially hydrophobic, film forming release agent. In the preferred embodiment, the attractant is water dispersible.

The attractant may be an animal by-product. The animal by-product may be an aquatic animal by-product. In the preferred embodiment, the aquatic animal by-product is selected from the group consisting of shrimp, salmon, squid, shad, sardines, anchovies, crayfish, mullet, and pheromones.

The attractant may be a plant by-product. The plant by-product may be an aromatic plant by-product. In the preferred embodiment, the aromatic plant by-product is selected from the group consisting of anise, garlic, banana oil, and pheromones. In the most preferred embodiment, the attractant is garlic or anise.

The attractant may be an organic chemical. The organic chemical may be steroids, fats, fatty acids or a nitrogen containing organic chemical. In the preferred embodiment, the nitrogen containing organic chemical is selected from the group consisting of alkaloids, amino acids, peptides, quaternary ammonium compounds, proteins and pheromones.

The attractant may further include an inorganic component, such as inorganic component is a salt. Also, the attractant may be encapsulated or complexed to further control the release time of the attractant.

A Control composition was prepared using grape seed oil to measure the relative effectiveness of the attractants. The composition for the Control is shown in Table 1, below:

TABLE 1

Control - Polymer-based

| Function | Component | Trade Name | (% W/W) |
|---|---|---|---|
|  | Deionized Water RT | n/a | 88.57 |
| Secondary thickening agent | Carbomer |  | 0.10 |
| PH adjusting Agent | Aminomethyl Propanol | AMP-95 | ~0.13 |
| Control | Grape Seed Oil | Arista Industries | 2.50 |
| Secondary film forming agent | Dimethicone | Dow Corning 245 | 2.00 |
| Primary thickening agent | Acrylates/C10-30 Alkyl Acrylate Cross-Polymer | Pemulen TR-2 | 0.20 |
| Primary film forming agent pH = 6.30-6.70 | Acrylates Copolymer pH = 6.30-6.70 | Avalure AC 118 | 6.50 |

Avalure AC 118: 40% Solids, MW 25,000.

In one embodiment, the substantially hydrophobic film forming releasing agent is a silicone-based polymer. Also, in the preferred embodiment, the molecular weight of the silicone-based polymer is between about 2500 and 100,000. The silicone-based polymer is an amino silicone polymer and the balance water. One example is sold under the tradename Amino Fluid SF 1708 and is available from GE Silicone of Waterford, N.Y.

A garlic oil silicone polymer-based composition was prepared. The composition for the garlic oil is shown in Table 2, below:

TABLE 2

Garlic Oil - Silicone Polymer-based

| Function | Component | Trade Name | (% W/W) |
|---|---|---|---|
|  | Deionized Water RT | n/a | 88.57 |
| Secondary thickening agent | Carbomer |  | 0.10 |
| PH adjusting Agent | Aminomethyl Propanol | AMP-95 | ~0.13 |
| Attractant | Garlic Oil | Chart Corporation | 2.50 |
| Secondary film forming agent | Dimethicone | Dow Corning 245 | 2.00 |
| Primary thickening agent | Acrylates/C10-30 Alkyl Acrylate Cross-Polymer | Pemulen TR-2 | 0.20 |
| Primary film forming agent pH = 6.30-6.70 | Amino silicone polymer pH = 6.30-6.70 | Amino Fluid SF 1708 | 6.50 |

In another embodiment, the substantially hydrophobic film forming releasing agent is perfluoroalkylhydrocarbon-based. Also, in the preferred embodiment, the viscosity of the perfluoroalkylhydrocarbon-based polymer is less than about 2000 cps. The perfluoroalkylhdyrocarbon-based polymer is a hydrophobic fluorocarbon and the balance water. One example is sold under the tradename Zonyl MP 1600N and is available from Dupont of Wilmington, Del.

A garlic oil hydrocarbon-based composition was prepared. The composition for the garlic oil is shown in Table 3, below:

TABLE 3

Garlic Oil - Perfluoroalkylhydrocarbon-based

| Function | Component | Trade Name | (% W/W) |
|---|---|---|---|
| Water | Deionized Water RT | n/a | 93.07 |
| Secondary thickening agent | Carbomer |  | 0.10 |
| PH adjusting Agent | Aminomethyl Propanol | AMP-95 | ~0.13 |
| Attractant | Garlic Oil | Chart Corporation | 2.5 |
| Secondary film forming agent | Dimethicone | Dow Corning 245 | 2.00 |
| Primary thickening agent | Acrylates/C10-30 Alkyl Acrylate Cross-Polymer | Pemulen TR-2 | 0.20 |
| Primary film forming agent pH = 6.30-6.70 | Perfluoroalkyl-hydrocarbon pH = 6.30-6.70 | Zonyl MP 1600N | 2.0 |

In still another embodiment, the substantially hydrophobic film forming releasing agent is a polymer. Also, in one preferred embodiment, the polymer is an acrylic copolymer and the balance water. One example is sold under the tradename Avalure AC 118 and is available from Noveon of Cleveland, Ohio A garlic oil polymer-based composition was prepared. The composition for the garlic oil is shown in Table 4, below:

TABLE 4

Garlic Oil - Polymer-based

| Function | Component | Trade Name | (% W/W) |
|---|---|---|---|
|  | Deionized Water RT | n/a | 88.57 |
| Secondary thickening agent | Carbomer |  | 0.10 |
| PH adjusting Agent | Aminomethyl Propanol | AMP-95 | ~0.13 |
| Attractant | Garlic Oil | Chart Corporation | 2.5 |
| Secondary film forming agent | Dimethicone | Dow Corning 245 | 2.00 |
| Primary thickening agent | Acrylates/C10-30 Alkyl Acrylate Cross-Polymer | Pemulen TR-2 | 0.20 |
| Primary film forming agent pH = 6.30-6.70 | Acrylates Copolymer pH = 6.30-6.70 | Avalure AC 118 | 6.50 |

Avalure AC 118: 40% Solids, MW 25,000.

Also, in still another preferred embodiment, the polymer is a vinyl homopolymer. The vinyl homopolymer is polyvinyl pyrrolidone and the balance water. One example is available from ISP of Wayne, N.J.

A second garlic oil polymer-based composition was prepared. The composition for the garlic oil is shown in Table 5, below:

TABLE 5

Garlic Oil - Polymer-based

| Function | Component | Trade Name | (% W/W) |
|---|---|---|---|
|  | Deionized Water RT | n/a | 35.07 |
| Ethanol | 95% Ethanol RT |  | 55.0 |
| Secondary thickening agent | Carbomer |  | 0.10 |
| PH adjusting Agent | Aminomethyl Propanol | AMP-95 | ~0.13 |
| Attractant | Garlic Oil | Chart Corporation | 2.50 |
| Secondary film forming agent | Dimethicone | Dow Corning 245 | 2.00 |
| Primary thickening agent | Acrylates/C10-30 Alkyl Acrylate Cross-Polymer | Pemulen TR-2 | 0.20 |
| Primary film forming agent pH = 6.30-6.70 | Polyvinyl-pyrrolidone pH = 6.30-6.70 | PVP | 5.00 |

As shown above, the substantially hydrophobic film forming releasing agent may further include a surfactant. Also, as shown, the substantially hydrophobic film forming releasing agent may further include a thickening agent and/or further include an emulsifying agent.

In terms of the methods of preparation, each of the compositions was prepared conventionally. Somewhat analogous compositions in the cosmetics industry are described for hair products in U.S. Pat. Nos. 6,432,386; 6,432,385; and 6,391,292, which are hereby incorporated by reference in their entirety.

Figure 4:
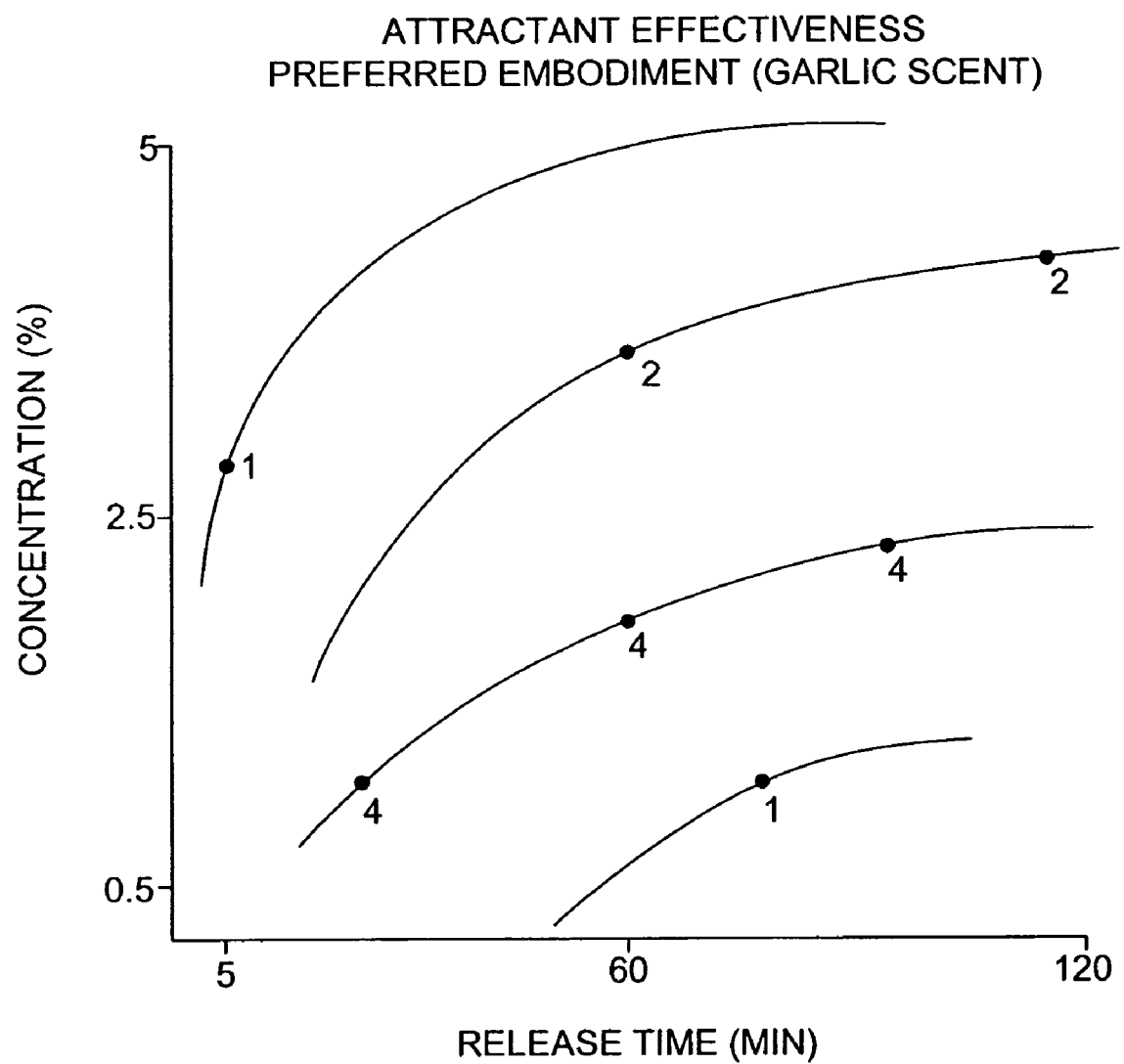
FIG. 4 is a graph illustrating the effectiveness of an attractant constructed according to the present invention.

FIG. 4 is a graphical representation of the relative effectiveness (1 to 5 scale with 1=poor and 5=very good) of the most preferred embodiment shown in Table 4. The graph illustrates that the controlled release attractant (garlic oil scent) when applied to the mixture between about 1% and 3% by volume and compounded to last on the lures and/or natural baits during successive casts for between 25 to 70 minutes is particularly effective in attracting fish under many different conditions.

Figure 5:
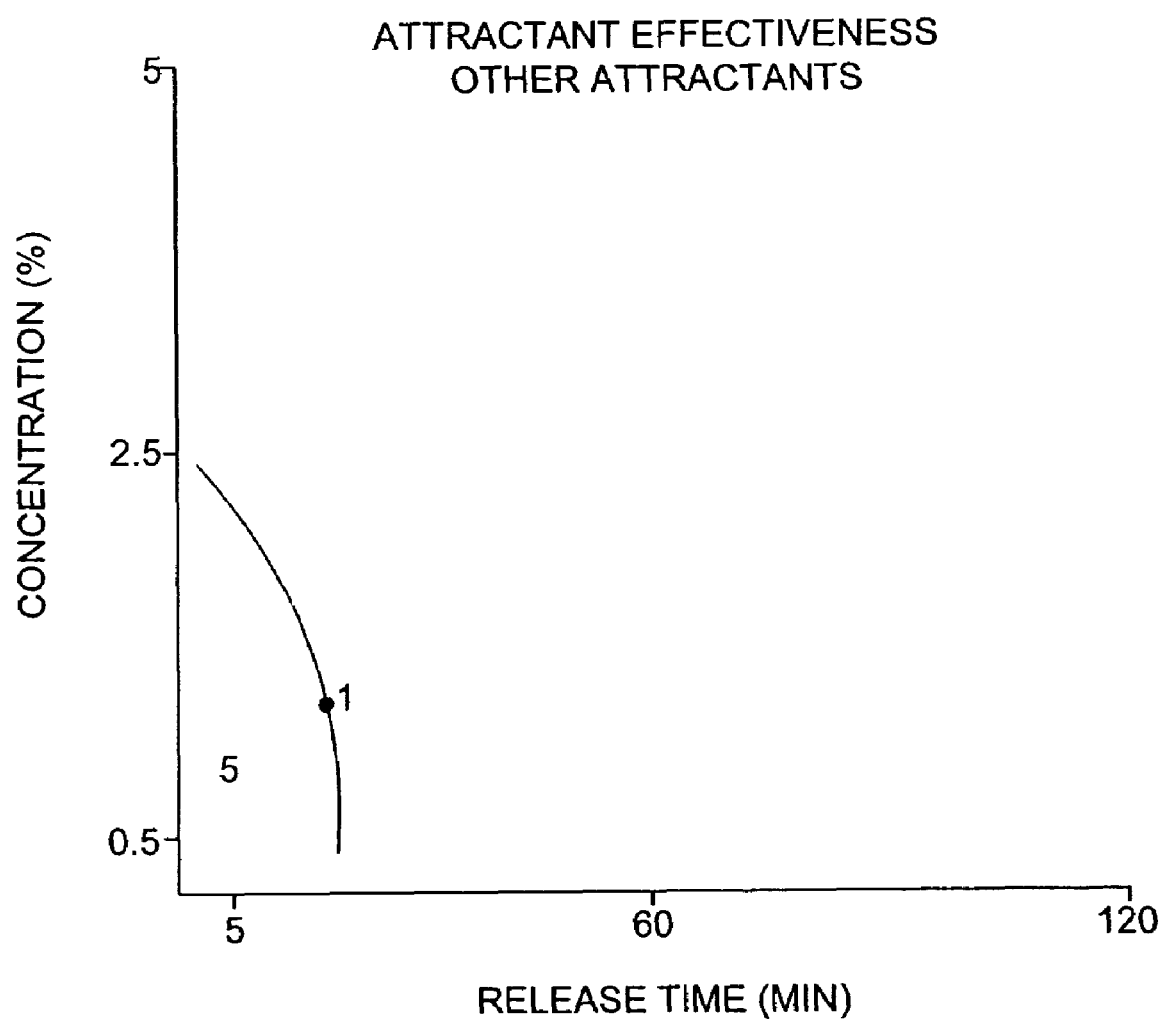
FIG. 5 is a graph illustrating the effectiveness of prior art attractants.

FIG. 5 illustrates the relative attractant effectiveness (1 to 5 scale with 1=poor and 5=very good) of prior art attractants currently on the market without the controlled release feature found in the preferred embodiment. As can be seen, these attractants do not last longer than about 1 to 5 successive casts when applied between about 0.5% and 2.5% by volume before becoming ineffective.

While, the preferred embodiment for the method of delivery would be spray or mixing, the controlled release attractant could also be utilized in an adhesive strip application, a gel or paste application.

In the preferred embodiment, the controlled release fish attractant 20 is applied to various lures and/or natural baits in order to attract fish, during sport fishing. The attractant may also be applied to cut bait or live bait. The attractant is released in a controlled manner as the lures and/or natural baits 16 are retrieved through the water.

The controlled release attractant 20 may be utilized for any game fish but is particularly suited for use in large mouth bass fishing with artificial lures and/or natural baits. The attractant 20 would serve as an additional enticement when the fisherman is using crank baits 16" or spinner baits 16'". These baits are generally retrieved at a greater speed than the soft plastic baits 16'. The crank bait 16" and spinner bait 16'" tend to have flashing colors, make noise as they move through the water and have erratic motion. These features are designed to attract the game fish particularly, the large mouth bass. The addition of an appealing attractant, which will last for multiple casts, will improve the catchability of these baits.

The soft plastic lures 16' is a bait which is generally regarded as a finesse bait. This type of bait is fished slowly and generally on the bottom. This bait is picked up gently by the bass and mouthed for taste or scent before it is taken completely in. The hook must be stoutly set when using soft plastic lures and natural baits 16' as contrasted with the crank bait 16" or spinner bait 16'". The fish virtually sets the hook when it attacks the crank bait 16" and the spinner bait 16'". The use of an appropriate attractant 20 is more critical when using soft plastic lures and natural baits 16'. The appropriate attractant entices the fish to keep the soft plastic lure and natural bait 16' in its mouth longer, thereby permitting the fisherman sufficient time to properly and stoutly set the hook.

Certain modifications and improvements will occur to those skilled in the art upon a reading of the foregoing description. It should be understood that all such modifications and improvements have been deleted herein for the sake of conciseness and readability but are properly within the scope of the following claims.

We claim:

1. A sport fishing system comprising:
    (a) a rod and reel, including fishing line;
    (b) at least one fishing lure or natural bait;
    (c) a controlled released fish attractant configured to be subsequently applied to coat the at least one lure or bait while fishing, wherein said controlled release fish attractant includes: (i) an attractant and (ii) a substantially hydrophobic, film forming release agent which is a silicone-based polymer having about 6% by weight silicone polymer; and
    (d) an applicator for applying said controlled released fish attractant to said fishing lure or natural bait while fishing.

2. The sport fishing system according to claim 1, wherein said applicator for the controlled released fish attractant is a spray bottle.

3. The sport fishing system according to claim 2, wherein said spray bottle is a hand pump applicator.

4. The sport fishing system according to claim 1, wherein said applicator for the controlled released fish attractant is an applicator kit for applying said controlled released fish attractant to said fishing lure or natural bait.

5. The sport fishing system according to claim 4, wherein said applicator kit includes a supply of said fish attractant and a mixing container for holding said fishing lures and/or natural baits and receiving a quantity of said fish attractant.

6. The sport fishing system according to claim 1, wherein said fishing lure or natural bait is selected from the group consisting of live bait, cut bait, soft plastic baits, crank baits and spinner baits.

7. The sport fishing system according to claim 6, wherein said soft plastic baits are finesse baits.

8. The sport fishing system according to claim 1, wherein said attractant is water dispersible.

9. The sport fishing system according to claim 1, wherein said attractant is an animal by-product.

10. The sport fishing system according to claim 9, wherein said animal by-product is an aquatic animal by-product.

11. The sport fishing system according to claim 10, wherein said aquatic animal by-product is selected from the group consisting of shrimp, salmon, squid, shad, sardines, anchovies, crayfish, mullet, and animal metabolites, such as pheromones.

12. The sport fishing system according to claim 1, wherein said attractant is a plant by-product.

13. The sport fishing system according to claim 12, wherein said plant by-product is an aromatic plant by-product.

14. The sport fishing system according to claim 13, wherein said aromatic plant by-product is selected from the group consisting of anise, garlic, banana oil, and plant metabolites, such as pheromones.

15. The sport fishing system according to claim 1, wherein said attractant is an organic chemical.

16. The sport fishing system according to claim 15, wherein said organic chemical is selected from the group consisting of steroids, fats, fatty acids or a nitrogen containing organic chemical.

17. The sport fishing system according to claim 16, wherein said nitrogen containing organic chemical is selected from the group consisting of alkaloids, amino acids, peptides, quaternary ammonium compounds, proteins and synthetic pheromones.

18. The sport fishing system according to claim 1, wherein said attractant further includes an inorganic component.

19. The sport fishing system according to claim 18, wherein said inorganic component is a salt.

20. The sport fishing system according to claim 1, wherein said attractant further includes encapsulation.

21. The sport fishing system according to claim 1, further including a surfactant.

22. The sport fishing system according to claim 1, further including a thickening agent.

23. The sport fishing system according to claim 1, further including an emulsifying agent.

24. The sport fishing system according to claim 1, wherein the molecular weight of said silicone-based polymer is between about 2500 and 100,000.

25. The sport fishing system according to claim 24, wherein said silicone-based polymer is an amino silicone polymer and the balance water.

* * * * *